Figure 1:
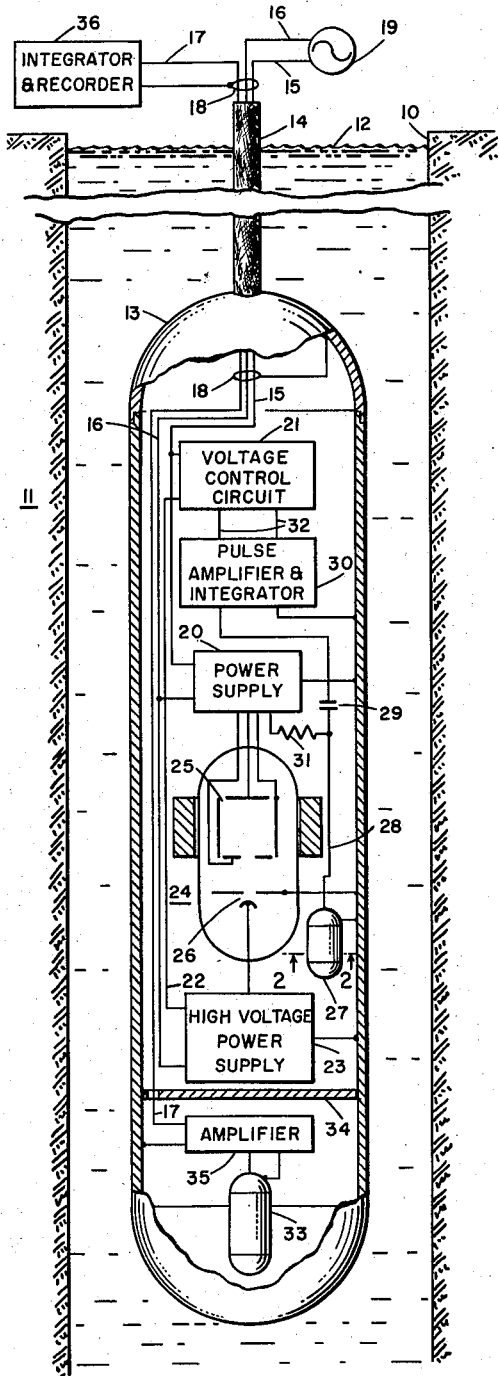

July 8, 1958     C. GOODMAN     2,842,695

RADIATION-RESPONSIVE APPARATUS

Filed May 17, 1954

*INVENTOR.*
CLARK GOODMAN
BY Robert Hoefield
HIS ATTORNEY

United States Patent Office 2,842,695
Patented July 8, 1958

2,842,695

RADIATION-RESPONSIVE APPARATUS

Clark Goodman, Boston, Mass., assignor, by mesne assignments, to Schlumberger Well Surveying Corporation, Houston, Tex., a corporation of Texas Application May 17, 1954, Serial No. 430,139

7 Claims. (Cl. 313—61)

This invention relates to radiation-responsive apparatus and, more particularly, pertains to a new and improved neutron detector for deriving indications of incident neutrons having an energy greater than a selected energy level.

Although useful in a wide variety of applications, a neutron detector in accordance with the present invention is ideally suited for use in apparatus adapted to be passed through a well or borehole drilled into the earth, and of the type including a generator of high energy neutrons for irradiating earth formations traversed by the borehole and a detector for observing a resulting nuclear phenomenon. For convenience, the invention will be described as embodied in a typical system of this general character which may be employed for logging the earth formations.

In order to interpret the secondary radiations observed while logging with a generator of high energy neutrons, it may be desirable to maintain a constant or known source intensity.

One prior control system for regulating neutron output is intended for use with a generator wherein particles are accelerated in a beam toward a target. Such a system is responsive to and adjusts the beam of particles in such a manner as to maintain a constant current incident on the target. Since the target may become depleted, obviously this control system may not provide the desired constant neutron output of the generator and a monitor responsive to the neutron output of the generator may be better suited for maintaining a constant neutron intensity throughout an entire logging run.

A conventional counter used in drill-hole logging is responsive primarily to neutrons of thermal energy level. Since the borehole into which the logging apparatus is lowered usually is filled with a drilling mud in which neutrons may be slowed down, this detector is undesirably sensitive to the mud surrounding the logging apparatus. Moreover, some of the earth formations may contain water or oil in which neutrons may be slowed down and the output of this detector represents this characteristic of the earth formations which is undesirable in monitoring the neutron source.

It is, therefore, an object of the present invention to provide a new and improved neutron detector which is not subject to the foregoing deficiencies of prior arrangements.

Another object of the present invention is to provide a new and improved neutron detector for deriving indications of incident neutrons having an energy greater than a selected level, and which is substantially unresponsive to neutrons having an energy below the selected level.

A neutron-responsive device embodying the present invention is adapted to derive indications of incident neutrons having an energy greater than a selected level and is comprised of a chamber in which ionization may occur. The chamber encloses a substance adapted to enter into reactions with incident neutrons to produce charged particles conducive to ionization in the chamber. These charged particles are emitted with a kinetic energy, $Ep$, essentially equal to the sum of the incident neutron energy, $En$, and the nuclear energy change, $Q$, of the reaction, i. e. $Ep \cong En + Q$. In accordance with the present invention a $Q$ is selected of negative value and sufficiently less in absolute magnitude than $En$ to make $Ep$ a few million electron volts, for example. In this way the ionization pulses produced by the charged particles are easily detected above background radiations. In other words, the reactions may exhibit a nuclear energy change of negative sense and of an absolute magnitude no greater than the selected energy level so that there is substantially no response to incident neutrons having an energy below the selected level.

Figure 2:
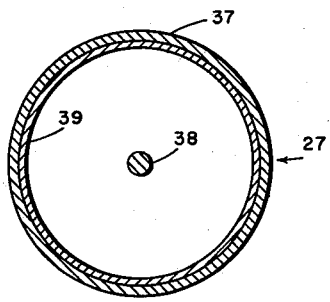

The novel features of the present invention are set forth with particularity in the appended claims. The present invention, both as to its organization and manner of operation, together with further objects and advantages thereof, may best be understood by reference to the following description taken in connection with the accompanying drawing in which:

Fig. 1 is a view in longitudinal cross section of a borehole logging instrument, schematically represented, and provided with a neutron detector embodying the present invention; and Fig. 2 is a sectional view taken along the line 2—2 of Fig. 1.

In Fig. 1 of the drawing, the neutron well logging apparatus provided with a neutron detector embodying the present invention is shown disposed in a borehole 10 traversing a plurality of earth formations 11. Borehole 10 usually contains a hydrogenous drilling liquid 12, such as a water base or oil base mud, and it may be lined with one or more strings of metallic casing (not shown), or it may be uncased, as illustrated.

The neutron well logging apparatus may comprise a pressure resistant housing 13 suspended in the borehole by means of an armored cable 14 which, in connection with a winch (not shown) located at the surface of the earth, is utilized to lower and raise the apparatus in the borehole in the customary manner.

Cable 14 also includes a plurality of insulated conductors 15, 16 and 17 and a shield 18 for connecting surface equipment with apparatus within housing 13. Of these, conductors 15 and 16 connect a source of alternating current 19 to a medium voltage power supply 20 and via a voltage control circuit 21, to be described more fully hereinafter, and a conductor 22 to a high voltage power supply 23.

The power supplies 20 and 23 are adapted to energize a neutron generator 24 which may be of any conventional type including an ion source 25 wherein deuterium ions are derived and an accelerating gap 26 for accelerating such ions toward a deuterium or tritium target to a velocity at which neutron-producing reactions may occur. For example, as illustrated in the drawing, ion source 25 may be of the specific type disclosed in the copending application of J. T. Dewan, filed April 9, 1952, bearing the Serial Number 281,378 and assigned to the same assignee as the present invention. Power supply 20 is arranged in the manner described in the Dewan application to energize ion source 25. Accelerating gap 26 may be similar to any one of the varieties disclosed in the copending application of Wayne R. Arnold, filed March 8, 1954, bearing the Serial Number 414,761 and assigned to the same assignee as the present invention. It includes a tritium-filled target and is energized by power supply 23.

In order to control the neutron flux produced by generator 24, a detector 27 embodying the present invention, and to be described in detail hereinafter, is disposed in housing 13 in the general vicinity of the target portion of accelerating gap 26. One output lead of detector 27 is grounded to housing 13 and the remaining output lead is connected by a lead 28 to a coupling condenser 29, in turn, connected to a conventional pulse amplifier and integrator unit 30. The necessary voltage for detector 27 is derived from power supply 20 over a decoupling resistor 31.

The output potential of unit 30, which is representative of a characteristic of the generated neutron flux, such as counts per unit time, is applied to the input circuit of voltage control circuit 21 over leads 32.

Elements 20, 21, 23 and 30 may be of conventional construction, or of the types described in the aforementioned Arnold application. As there stated, control circuit 21 may include a magnetic amplifier connected in a servo-circuit which compares the potential from amplifier-integrator 30 with a reference potential to derive a control effect. This control effect may be the adjustment of the value of an impedance effectively connected between leads 15 and 22. Accordingly, the potential which energizes high voltage power supply 23 is dependent upon the generated neutron flux.

To obtain a log, for example, of the resulting gamma radiation, a radioactivity responsive device or detector 33 is supported at the lower end of housing 13 below a shield plate 34 employed to shield the detector from radiation emanating from generator 24. Detector 33 may be a suitably energized Geiger-Mueller tube coupled to an amplifier 35 having its output circuit connected to lead 17 and housing 13. The output of amplifier 35 is derived at the surface of the earth by connections from lead 17 and shield 18 to an integrator and recorder unit 36. Unit 36, for example, may comprise a capacitor for deriving a potential representing the number of pulses applied per unit time and a recording voltmeter to which this potential is applied. The recording medium of the voltmeter is displaced in a customary manner in synchronism with movement of housing 13 through borehole 10 so that a continuous log may be obtained.

Turning now to the details of neutron detector 27 embodying the present invention, as shown in Fig. 2, the detector is comprised of a housing 37 constructed of an electrically conductive material such as steel. The detector is provided with a conductive, central electrode 38 and is lined with a substance 39 responsive to fast neutrons. For example, tantalum oxide may be employed wherein the oxygen is 99.76% of atomic weight 16. The oxygen in layer 39 is adapted to enter into reactions with incident neutrons to produce charged particles, such as protons. These charged particles are emitted with a kinetic energy, $Ep$, essentially equal to the sum of the incident neutron energy, $En$, and the nuclear energy change, $Q$, of the reaction. This relationship may be expressed as follows:

$$Ep \cong En + Q \qquad (1)$$

In accordance with the present invention a Q is selected of negative value and sufficiently less in absolute magnitude than $En$ so that $Ep$ becomes a few million electron volts to satisfy Equation 1 above. In other words, these reactions exhibit a nuclear energy change of negative sense and of an absolute magnitude such that these reactions are not produced by the neutrons returned toward housing 13 from formations 11 and drilling mud 12. In this illustrative example, the nuclear energy change or "Q" is minus 9.24 million electron volts (m. e. v.). The space between electrode 38 and layer 39 of the detector is filled to a pressure of a few centimeters of mercury with an ionizable gas, such as argon, adapted to become ionized in the presence of the protons derived in layer 39, but of large enough atomic weight to give negligible ionization when struck by a fast neutron. Connections to detector 27 are completed by a lead between housings 13 and 37 and by extending lead 28 to electrode 38.

In operation, housing 13 is lowered into borehole 10 prior to the closing of a control switch (not shown). This switch connects source 19 to leads 15 and 16 and thus neutron generator 24 is energized by power supplies 20 and 23. Deuterium ions are derived in ion source 25 and some of these enter accelerating gap 26. Accordingly, highly accelerated positive deuterium ions react with tritium in the target portion of the accelerating gap and neutrons at an energy level of 14 m. e. v. are generated.

High energy neutrons emanating from generator 24 irradiate earth formations 11 and some of the resulting nuclear radiation is incident on Geiger-Mueller tube 33. Detector 33 responds to gamma radiation and its output is amplified in amplifier 35 and supplied to the integrator and recorder unit 36 so that a neutron-gamma ray log is obtained. Such a log features information regarding the earth formations traversed by the borehole as enumerated in detail in the copending application of Clark Goodman, filed March 11, 1952, bearing Serial Number 275,932 and assigned to the same assignee as the present invention.

A small fraction of the 14 m. e. v. neutrons emanating from generator 24 arriving at detector 27, traverse housing 37 and enter layer 39. Some of these neutrons enter into reactions with the oxygen of layer 39 and the resulting protons cause ionization of the argon within the detector. Each time ionization occurs, a pulse is developed and the resulting pulses are amplified and integrated in stage 30 to develop a control potential which is supplied to voltage control circuit 21.

If the neutron flux on detector 27 increases, the number of counts per second increases, and the voltage control circuit reduces the voltage supplied to high voltage power supply 23. Accordingly, a lower voltage is applied to accelerating gap 26, thereby decreasing the neutron flux. Conversely, a decrease in the neutron flux causes an increase in the high voltage supplied to the accelerating gap. In this way, the neutron yield remains substantially constant over a wide variety of operating conditions.

Since the reaction between the oxygen and the neutrons involves a high negative Q, scattered neutrons of low energy do not react to any appreciable extent. However, the cross section of the reaction and the energy of the resulting protons are ideally suited for monitoring high energy neutrons.

Because the cross section of the neutron-oxygen reaction is only moderate, the counter may be located directly adjacent the target of accelerating gap 26 without obtaining unduly high counting rates. This close spatial relationship may be employed, even though the neutron yield may be as high as $10^9$ or $10^{10}$ neutrons per second.

It is evident, therefore, that a neutron detector constructed in accordance with the present invention is adapted to derive indications of incident neutrons having an energy greater than a selected energy level, and is substantially unresponsive to neutrons whose energy is lower than this level. Accordingly, the detector is not subject to the deficiencies of various prior arrangements.

If desired, instead of automatic control, manual control may be provided. In this connection, the output of unit 30 is supplied to an indicator (not shown) at the surface of the earth instead of to control circuit 21. A suitable arrangement of a battery and potentiometer (not shown) may be connected to leads 32 for producing a control signal to adjust circuit 21.

The detector may, of course, be filled with other kinds of gases. For example, krypton and xenon may be employed.

If desired, in place of steel housing 37 and tantalum oxide layer 39, an aluminum housing may be utilized on the inside of which is a thin surface layer of aluminum oxide.

Alternatively, instead of lining the housing 37 with a material responsive to fast neutrons, the proportional counter may be filled with a gas, such as oxygen, adapted to enter into reactions with neutrons wherein the nuclear energy change is of negative sense and of the desired absolute magnitude.

Although oxygen has been suggested hereinbefore as one of the materials adapted to react with incident neutrons above a selected energy level, any of the following substances may be suitably employed:

| Substance | "Q," m. e. v. | Reaction |
|---|---|---|
| Neon (as gas) | 1.5 | $Ne^{20}(n,\alpha)$ |
| Phosphorus (as element or compounds) | 1.3 | $P^{31}(n,p)$ |
| Sulfur (as element or compounds) | 0.9 | $S^{32}(n,p)$ |
| Thorium (as element or compounds) | 1.0 | $Th^{232}(n,f)$ |

These substances are especially suited for monitoring the output of a generator which derives neutrons at an energy in the neighborhood of 3 m. e. v., such as where deuterium-deuterium reactions are involved.

While particular embodiments of the present invention have been described, it is apparent that changes and modifications may be made without departing from this invention in its broader aspects, and therefore the aim in the appended claims is to cover all such changes and modifications as fall within the true spirit and scope of this invention.

I claim:

1. A neutron-responsive device for deriving indications of incident neutrons having an energy at least equal to a selected energy level substantially to the exclusion of neutrons having an energy smaller than said selected energy level comprising a chamber wherein ionization may occur, and a substance enclosed by said chamber and adapted to enter into reactions with incident neutrons to produce charged particles conducive to said ionization, said reactions exhibiting a nuclear energy change of negative sense and of an absolute magnitude substantially equal to said selected energy level.

2. A neutron-responsive device for deriving indications of incident neutrons having an energy at least equal to a selected energy level substantially to the exclusion of neutrons having an energy smaller than said selected energy level comprising a housing having an inner surface, an ionizable gas enclosed by said housing, and a layer of material covering said inner surface of said housing, at least, in part, and adapted to enter into reactions with incident neutrons to produce charged particles conducive to ionization of said gas, said reactions exhibiting a nuclear energy change of negative sense and of an absolute magnitude substantially equal to said selected energy level.

3. A neutron-responsive device for deriving indications of incident neutrons having an energy at least equal to a selected energy level substantially to the exclusion of neutrons having an energy smaller than said selected energy level comprising a housing having an inner surface, an ionizable gas enclosed by said housing, and a layer of material included in said inner surface of said housing and adapted to enter into reactions with incident neutrons to produce charged particles conducive to ionization of said gas, said reactions exhibiting a nuclear energy change of negative sense and of an absolute magnitude substantially equal to said selected energy level.

4. A neutron-responsive device for deriving indications of incident neutrons having an energy at least equal to a selected energy level substantially to the exclusion of neutrons having an energy smaller than said selected energy level comprising a chamber, and an ionizable gas enclosed by said chamber and adapted to enter into reactions with incident neutrons to produce charged particles conducive to ionization, said reactions exhibiting a nuclear energy change of negative sense and of an absolute magnitude substantially equal to said selected energy level.

5. A neutron-responsive device for deriving indications of incident neutrons having an energy at least equal to a selected energy level substantially to the exclusion of neutrons having an energy smaller than said selected energy level comprising a material defining a chamber and adapted to enter into reactions with incident neutrons to produce charged particles, said reactions exhibiting a nuclear energy change of negative sense and of an absolute magnitude substantially equal to said selected energy level, and an ionizable gas enclosed by said chamber and adapted to become ionized in the presence of said charged particles.

6. A neutron-responsive device for deriving indications of incident neutrons having an energy at least equal to a selected energy level substantially to the exclusion of neutrons having an energy smaller than said selected energy level comprising a chamber wherein ionization may occur, and a substance enclosed by said chamber and adapted to enter into reactions with incident neutrons having an energy $En$ to produce charged particles having an energy $Ep$ conducive to ionization of said gas, the relationship of $En$ to $Ep$ being expressed as follows:

$$Ep \cong En + Q$$

where Q is the nuclear energy change of said reactions, and has negative value and an absolute magnitude substantially equal to said selected energy level.

7. A radiation-responsive device for deriving indications of incident neutrons having an energy at least equal to a selected energy level substantially to the exclusion of neutrons having an energy smaller than said selected energy level comprising a chamber wherein ionization may occur, and a substance including oxygen enclosed by said chamber and adapted to enter into endothermic reactions with incident neutrons to produce charged particles conducive to said ionization.

References Cited in the file of this patent

UNITED STATES PATENTS

| 2,270,373 | Kallmann et al. | Jan. 20, 1942 |
| 2,493,935 | Wiegand et al. | Jan. 10, 1950 |
| 2,519,007 | Wilson | Aug. 15, 1950 |
| 2,596,080 | Raper et al. | May 6, 1952 |
| 2,616,052 | Hurst | Oct. 28, 1952 |

OTHER REFERENCES

Li et al.: Physical Review, vol. 83, pp. 512–515 (1951).